(No Model.)
E. T. REICHERT.
SECONDARY BATTERY.
No. 315,340.  Patented Apr. 7, 1885.
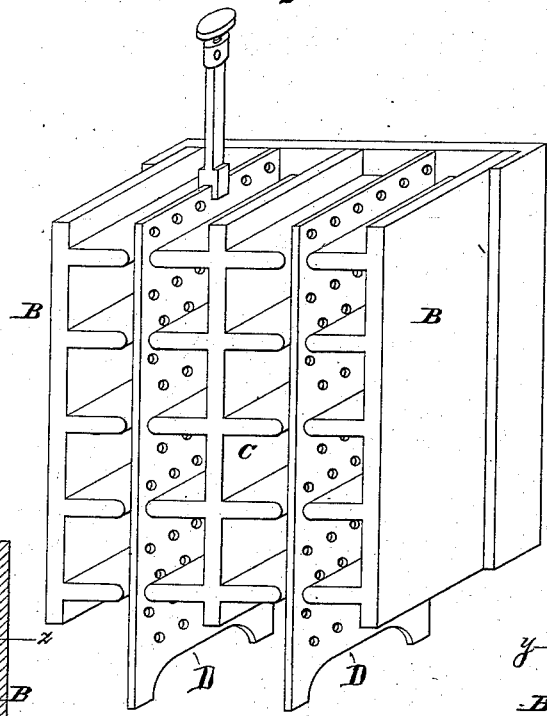
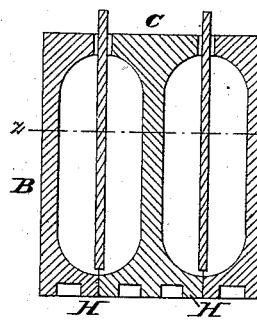
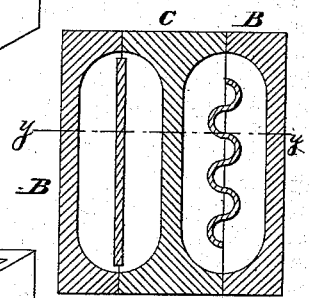
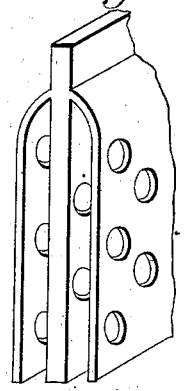
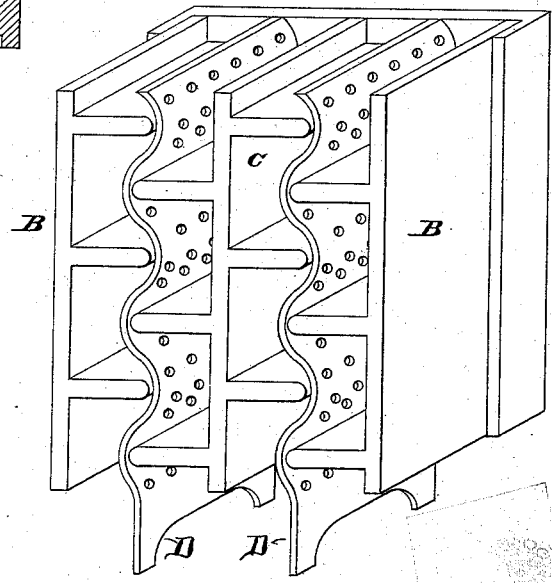
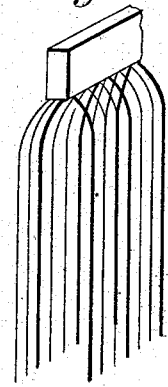
WITNESSES:
A. P. Grant,
W. F. Kircher
INVENTOR:
Edward T. Reichert,
BY John A. Wiedersheim
ATTORNEY.

UNITED STATES PATENT OFFICE.

EDWARD T. REICHERT, OF PHILADELPHIA, PENNSYLVANIA, ASSIGNOR OF ONE-HALF TO HENRY D. WELSH, OF SAME PLACE.

SECONDARY BATTERY.

SPECIFICATION forming part of Letters Patent No. 315,340, dated April 7, 1885.

App'icati n filed December 15, 1882. (No model.)

*To all whom it may concern:*

Be it known that I, EDWARD T. REICHERT, a citizen of the United States, residing in the city and county of Philadelphia, State of Pennsylvania, have invented a new and useful Improvement in Secondary Batteries, which improvement is fully set forth in the following specification and accompanying drawings, in which—

Figures 1 and 2 represent perspective interior views of double cells for secondary batteries embodying my invention, one side of the outer wall being removed. Figs. 3 and 4 represent detail views of electrodes which may be used therein. Fig. 5 represents a vertical section of one form of my improved secondary battery, taken on the line $y$ $y$ of Fig. 6; and Fig. 6 represents a horizontal section on the line $x$ $x$ of Fig. 5.

Similar letters of reference indicate corresponding parts in the several figures.

This invention relates to secondary batteries; and it consists, chiefly, in the combination of an outer non-conducting wall with an inner detachable non-conducting partition which divides the space inclosed by said wall into two cells, electrodes within said cells, and polarizable material on both sides of said electrodes, the said wall and partition being provided with lateral flanges or ridges, for the purpose hereinafter set forth.

The said invention further consists in an interior partition, the bottom of which forms partly or wholly the bottom of a cell, and has its under side provided with feet, in combination with an electrode in said cell, substantially as hereinafter set forth and claimed.

Referring to the drawings, in Figs. 1 and 2, B designates the outer porous plate or wall of a double cell; C, the inner porous plate or partition which divides the space within said wall into two compartments or cells, and D represents the two electrodes, which are arranged, respectively, on each side of said partition—one in each single cell. There is thus formed a double cell having a dividing or separating partition, C, common to both.

In Figs. 5 and 6 I have shown another form of double cell embodying my invention, which consists of three plates, B B C, brought together, C being the middle plate. Each plate may be likened to a flat plate having a rim, ridge, or projection around its edges, said rim being so constructed that when two plates are brought together a complete cell is formed with a partially-open top, or when three plates are brought together a double cell is formed.

The walls B C of the cells shown in Figs. 1 and 2 have on the sides parallel series of projections, ridges, or ledges having a horizontal, oblique, or vertical direction, or a combination of any or all of them, the free edges of which come in direct contact, or nearly so, with the surface of the electrode or element, or its coating, the object of which projections is to support and securely maintain in contact with the electrode or element the coating or deposit of oxidizable or polarizable material which is formed on or placed in contact with the said element. The projections, &c., may be opposite each other, as in Fig. 1, thus permitting the use of a straight or flat element or electrode, or one corrugated or bent in a zigzag or other suitable form, to gain a large extent of surface. The cavity included in the walls of the double porous cell is just sufficiently large to admit an electrode or element, with its coating of active material. I do not, however, limit myself to the use of an electrode upon which the coating has been previously formed, because these elements or electrodes, with their coating, can be very readily formed, without any preliminary formation, by simply placing the electrodes or elements in the cells, then packing about them a suitable active or polarizable substance, and then subjecting the electrode and its packing to the proper electrical or electro-chemical influences.

By the construction of the porous plates, partitions, or cells thus described the principal objects gained are—

First. By having the cavities of said porous cells of just sufficient size to accommodate the electrode or element, with its coating, the said coating is kept securely supported and maintained in position in contact with the electrode or element, so that jarring, the washing and disintegrating effects due to agitation of the electrolytic fluid, as well as many other apparent mechanical or physical causes, are effectually overcome.

Second. By having the cavities of said porous cells of just sufficient size to accommodate the electrode or element, with its coating, the said electrode can be made of extreme lightness, it having just sufficient metal left, after fully forming, to conduct the current of electricity generated or transmitted. Moreover, by having the cavity of the size herein specified, the electrode does not require preliminary forming, but may be placed therein and packed in active or polarizable material, and then formed. It is obvious from what has just been stated that by the above means a considerably lighter element or electrode can be used than when the element or electrode is practically self-supporting, as in other secondary batteries, while at the same time the quantity of active or polarizable material placed in contact with the electrode or element is almost indefinite; in fact, so light can these elements or electrodes be made that a plate which is so perforated or slotted as to be a mere skeleton (of which an illustration is given in Figs. 3, 4) can be used with great advantage, and wire gauze or ribbon, or a bunch of short wires soldered together at the top, is specially adaptable. By thus being enabled to use such exceedingly light electrodes or elements the weight of the battery and its cost are materially diminished, as well as other advantages gained, which are apparent. The plates or wires of which the electrodes are formed are united to a stock which they have in common.

Third. By using a porous and non-conducting partition or wall between the two cells the formation of "lead trees" or other deleterious connection between the electrodes or elements or their coating is prevented. There are also divers additional advantages resulting from the structure of my cells, which need not be enlarged upon here.

Having thus described my invention, what I claim as new, and desire to secure by Letters Patent, is—

1. The non-conducting outer wall or partition, B, and the inner detachable wall or partition, C, of non-conducting material, which divides the space inclosed by said outer wall into two chambers or cells, in combination with electrodes introduced, respectively, into said cells, and provided with polarizable material on both sides thereof, said walls or partitions being provided with lateral flanges or ridges which extend nearly or quite to said electrodes, for the purposes set forth.

2. In a secondary battery, an interior partition the bottom of which forms partly or wholly the bottom of a cell, and has its under side provided with feet, in combination with an electrode in said cell, substantially as set forth.

EDWARD T. REICHERT.

Witnesses:
JOHN A. WIEDERSHEIM,
A. P. GRANT.